(12) United States Patent
Hansen

(10) Patent No.: US 7,077,006 B2
(45) Date of Patent: Jul. 18, 2006

(54) HIGH-ACCURACY WHEEL SPACER

(76) Inventor: Allan H. Hansen, 19126 Double Eagle Dr., Cornelius, NC (US) 28031

( * ) Notice: Subject to any disclaimer, the term of this patent is extended or adjusted under 35 U.S.C. 154(b) by 0 days.

(21) Appl. No.: 10/441,483

(22) Filed: May 20, 2003

(65) Prior Publication Data

US 2004/0149033 A1 Aug. 5, 2004

Related U.S. Application Data

(60) Provisional application No. 60/444,764, filed on Feb. 4, 2003.

(51) Int. Cl.
G01M 1/06 (2006.01)
G01M 1/02 (2006.01)

(52) U.S. Cl. ............................. 73/487; 73/484
(58) Field of Classification Search ............... 73/487, 73/460, 462, 480, 484, 459
See application file for complete search history.

(56) References Cited

U.S. PATENT DOCUMENTS

| | | | |
|---|---|---|---|
| 2,201,982 A | 5/1940 | Bazarek | |
| 3,667,299 A | 6/1972 | Roberts | |
| 3,688,561 A * | 9/1972 | Haag | 73/484 |
| 3,889,542 A | 6/1975 | Carrigan | |
| 4,188,828 A | 2/1980 | Cuccolini | |
| 4,332,169 A | 6/1982 | Stuart | |
| 4,354,386 A * | 10/1982 | Newton | 73/487 |
| 4,433,578 A | 2/1984 | Hill | |
| 4,462,253 A | 7/1984 | Becher | |
| 4,478,081 A | 10/1984 | Greene | |
| 4,699,431 A | 10/1987 | Daberkoe | |
| 5,948,980 A | 9/1999 | Rossteuscher | |
| 5,987,761 A | 11/1999 | Ohnesorge | |
| 6,059,378 A | 5/2000 | Dougherty et al. | |
| 6,338,273 B1 | 1/2002 | Warkotsch | |
| 6,481,281 B1 | 11/2002 | Gerdes | |
| 6,575,030 B1 * | 6/2003 | Lauf et al. | 73/487 |

FOREIGN PATENT DOCUMENTS

JP 58-093655 * 6/1983

* cited by examiner

*Primary Examiner*—Helen Kwok
(74) *Attorney, Agent, or Firm*—Schwartz Law Firm P.C.

(57) ABSTRACT

A high-accuracy wheel spacer is used in an off-vehicle wheel servicing machine. The servicing machine includes an elongated mounting shaft operatively connected to a drive motor and extending outwardly from a motor housing. A face plate is fixed to the mounting shaft proximate the motor housing and cooperates with a clamping assembly to sandwich and dynamically center the vehicle wheel on the shaft. The wheel spacer includes a base having first and second opposing major surfaces. A plurality of outwardly-projecting spacer pins depend from the first major surface of the base, and are adapted for engaging a limited surface area of the face plate.

9 Claims, 7 Drawing Sheets

HIGH-ACCURACY WHEEL SPACER

This application claims benefit of application Ser. No. 60/444,764 filed Feb. 04, 2003.

TECHNICAL FIELD AND BACKGROUND OF THE INVENTION

This invention relates to a high-accuracy wheel spacer used in an off-vehicle wheel servicing machine, such as an electronic spin balancer. The balancer incorporates a mid-centering device comprising a horizontal mounting shaft extending outwardly from an electric motor housing, and an annular "face plate" fixed to the mounting shaft near the housing. The vehicle wheel is applied to the mounting shaft through its center hole, and is urged against the face plate using known suitable clamping means, such as a wingnut tightener. The spacer of the present invention is used when servicing large wheels, such as those provided on sport utility vehicles and commercial trucks. Unlike smaller wheels found on most passenger vehicles, larger wheels have a relatively deep rim which often hits against the motor housing and prevents proper mounting of the wheel against the face plate. The present spacer sits directly against the face plate of the mid-centering device, and serves to space the vehicle wheel a clearing distance from the motor housing.

Proper wheel balancing promotes a smooth vehicle ride and helps maximize the life of the tires. An out-of-balance wheel produces an annoying vibration or "shake" which intensifies in direct proportion to vehicle speed. The up-and-down shaking of the wheel is hard on the suspension, adversely effects vehicle handling, and can cause cupping and premature wear of the tire tread.

Almost all service facilities and tire stores today use an off-vehicle electronic spin balancer to balance vehicle wheels. The tire and wheel are applied to a horizontal mounting shaft, urged tightly against the face plate of the balancer, and then spun to find any heavy spots on the wheel. The balancer then indicates where weights (and how much weight) need to be placed to counterbalance the heavy spots. Off-vehicle spin balancers actually check two kinds of balance—"static" and "dynamic." Static imbalance causes a wheel to shake up and down as it spins, so static balance is achieved when both halves of the tire wheel assembly weigh exactly the same. Dynamic imbalance causes a tire and wheel to wobble back and forth, or sideways, as it spins. Dynamic balance is achieved when the front and back sides of the wheel and tire weigh the same. To achieve proper balancing, the wheel must be clamped in a precisely centered condition on the balancer mounting shaft, both statically and dynamically. As a general rule of thumb, the best balance on an average size tire and wheel assembly is achieved when residual static imbalance is less than ¼ ounce, and residual dynamic imbalance is less than ¼ ounce per plane. In order to attain this precision, the wheel balancer has highly accurate surfaces which must remain clean and substantially wear-free.

After sliding the wheel onto the balancer mounting shaft, the wheel is generally forced directly against the face plate of the balancer and clamped into position using standard components, such as a common flange plate and threaded wingnut tightener. The face plate is formed of steel which is precisely accurately machined and often ground. For larger wheels, a spacer is required to provide sufficient clearance between the wheel rim and motor housing of the balancer, as described above. Prior art wheel spacers typically contact the entire surface area of the balancer's face plate. Since the face plate generally collects a small amount of dirt, dust, and other minute debris during normal shop use, the spacer is often forced by this debris to sit very slightly "titled" against the face plate, thereby creating a dynamic imbalance in the wheel. Thus, because of deficiencies and limitations of prior art spacers, the expensive and precise construction of the balancer face plate is generally negated.

The present invention addresses the need for a highly accurate spacer which effectively locates the wheel a spaced distance from the balancer motor housing. The invention cooperates with clamping elements to tightly mount the vehicle wheel on the balancer shaft in a precisely accurate dynamically centered condition notwithstanding the presence of dirt or other minute debris on the face plate.

SUMMARY OF INVENTION

Therefore, it is an object of the invention to provide a high-accuracy wheel spacer designed for use with an off-vehicle wheel servicing machine, such as a dynamic spin balancer or brake lathe.

It is another object of the invention to provide a high-accuracy wheel spacer which allows precisely accurate dynamic centering of the vehicle wheel on the mounting shaft of the servicing machine.

It is another object of the invention to provide a high-accuracy wheel spacer which allows precisely accurate dynamic centering of the vehicle wheel despite the presence of dirt and other minute debris on the face plate of the servicing machine.

It is another object of the invention to provide a high-accuracy wheel spacer which engages only a very small surface area of the face plate of the servicing machine.

It is another object of the invention to provide a high-accuracy wheel spacer which engages less than 50% of the surface area of the face plate, and preferably less than 10%, and more preferably less than 5%. The surface area of the face plate is that surface which faces the vehicle wheel and extends perpendicular to the mounting shaft.

These and other objects of the present invention are achieved in the preferred embodiments disclosed below by providing a high-accuracy wheel spacer for use in an off-vehicle wheel servicing machine. The servicing machine includes an elongated mounting shaft operatively connected to a drive motor and extending outwardly from a motor housing. A face plate is fixed to the mounting shaft proximate the motor housing and cooperates with clamping means to sandwich and dynamically center the vehicle wheel on the shaft. The wheel spacer includes a base having first and second opposing major surfaces. A plurality of outwardly-projecting spacer pins depend from the first major surface of the base, and are adapted for engaging a limited surface area of the face plate. As the vehicle wheel is applied to the mounting shaft of the servicing machine and urged against the second major surface of the base, the spacer pins cooperate to space the vehicle wheel a predetermined distance from the face plate such that the vehicle wheel sufficiently clears the motor housing for free and unobstructed rotation by the mounting shaft.

According to another preferred embodiment of the invention, the base includes an annular plate defining a center hole adapted for receiving the mounting shaft of the servicing machine.

According to another preferred embodiment of the invention, the diameter of the center hole is greater than 50 percent of the diameter of the annular plate. Preferably, the center hole is sufficiently large to receive a wheel-centering adapter between the face plate of the servicing machine and the vehicle wheel.

According to another preferred embodiment of the invention, each of the pins has a shoulder adapted for engaging an edge of the face plate, and a reduced-diameter locating tip. The locating tip extends from the shoulder and is adapted for engaging a rim of the face plate adjacent the edge.

Preferably, the spacer has no more than four spacer pins.

According to another preferred embodiment of the invention, each of the pins includes an elongated cylinder adapted for engaging a mounting surface of the face plate.

According to another preferred embodiment of the invention, each of the pins defines an internal screw thread adapted for receiving a complementary-threaded bolt through a bolt hole formed in the face plate.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
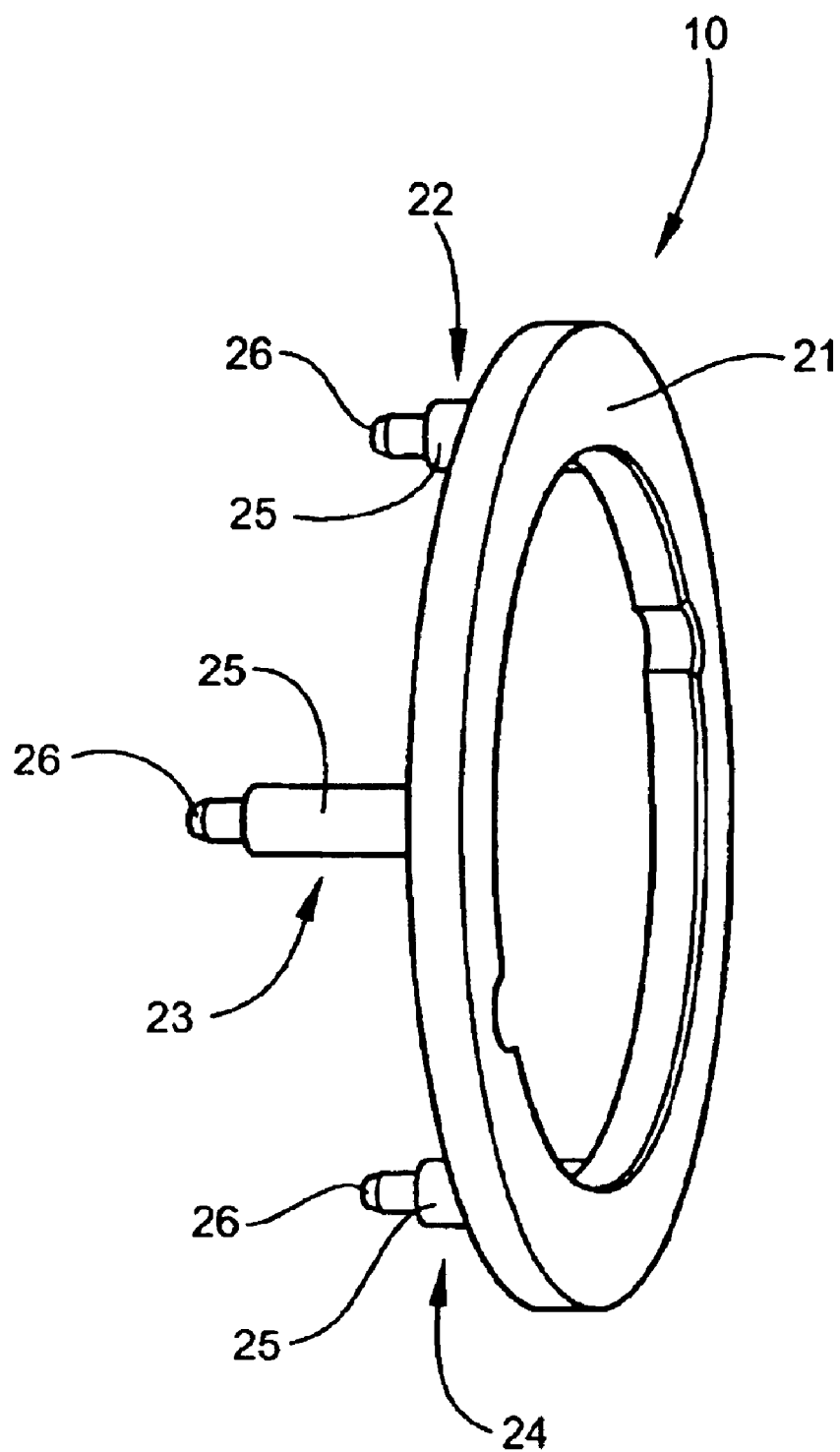
FIG. 1 is perspective view of a wheel spacer according to one preferred embodiment of the present invention, and adapted for use in a wheel servicing machine to space the vehicle wheel a clearing distance from the motor housing.

Referring now specifically to the drawings, a high-accuracy wheel spacer according to the present invention is illustrated in FIG. 1, and shown generally at reference numeral 10. The wheel spacer 10 is especially applicable for use in off-vehicle wheel servicing machines, such as spin balancers and brake lathes, when mounting large wheels commonly used on SUV's and commercial trucks.

Figure 2:
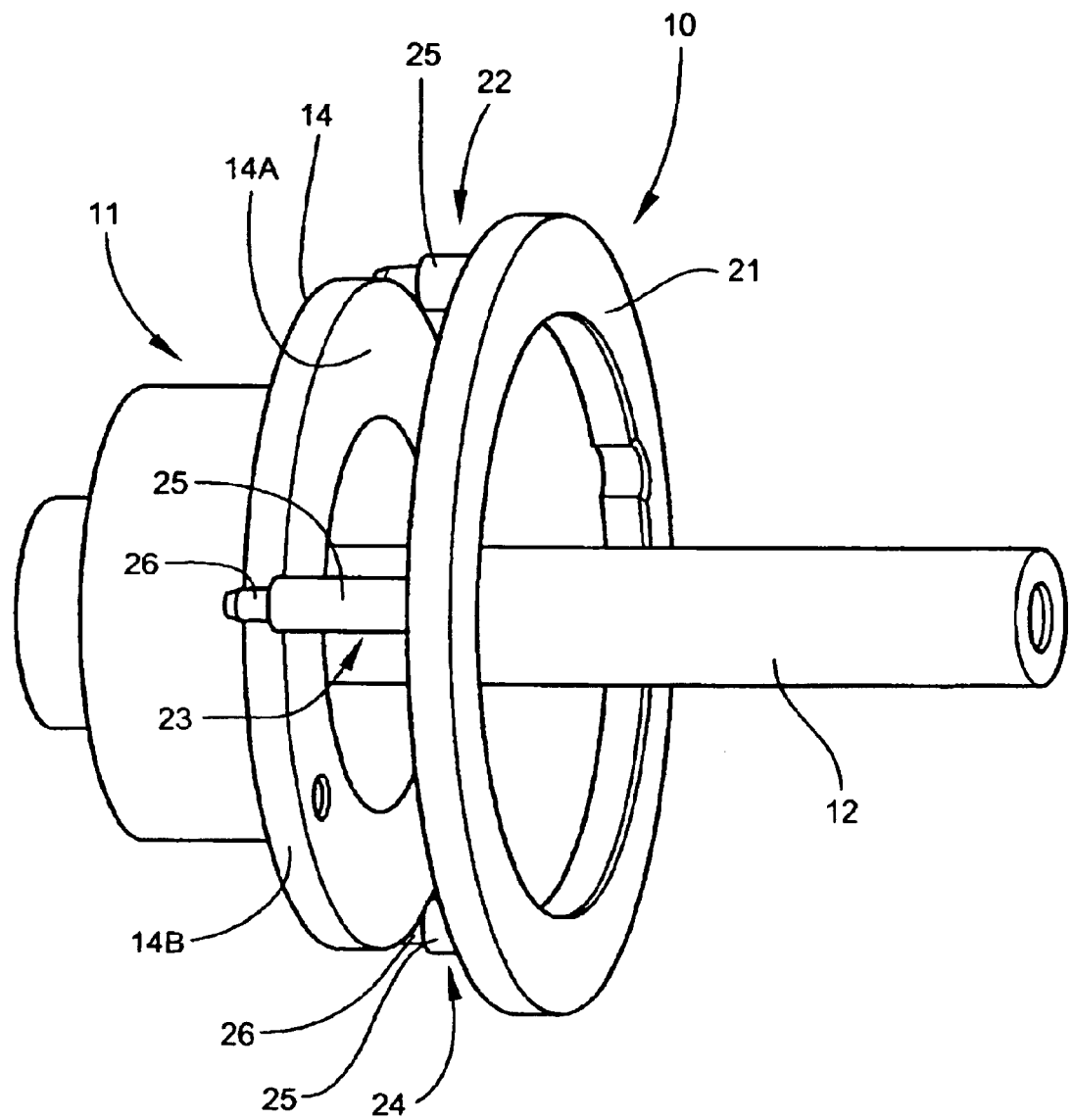
FIG. 2 is a perspective view of the wheel spacer positioned on a mid-centering device of a side-load, dynamic spin balancer.
Figure 5:
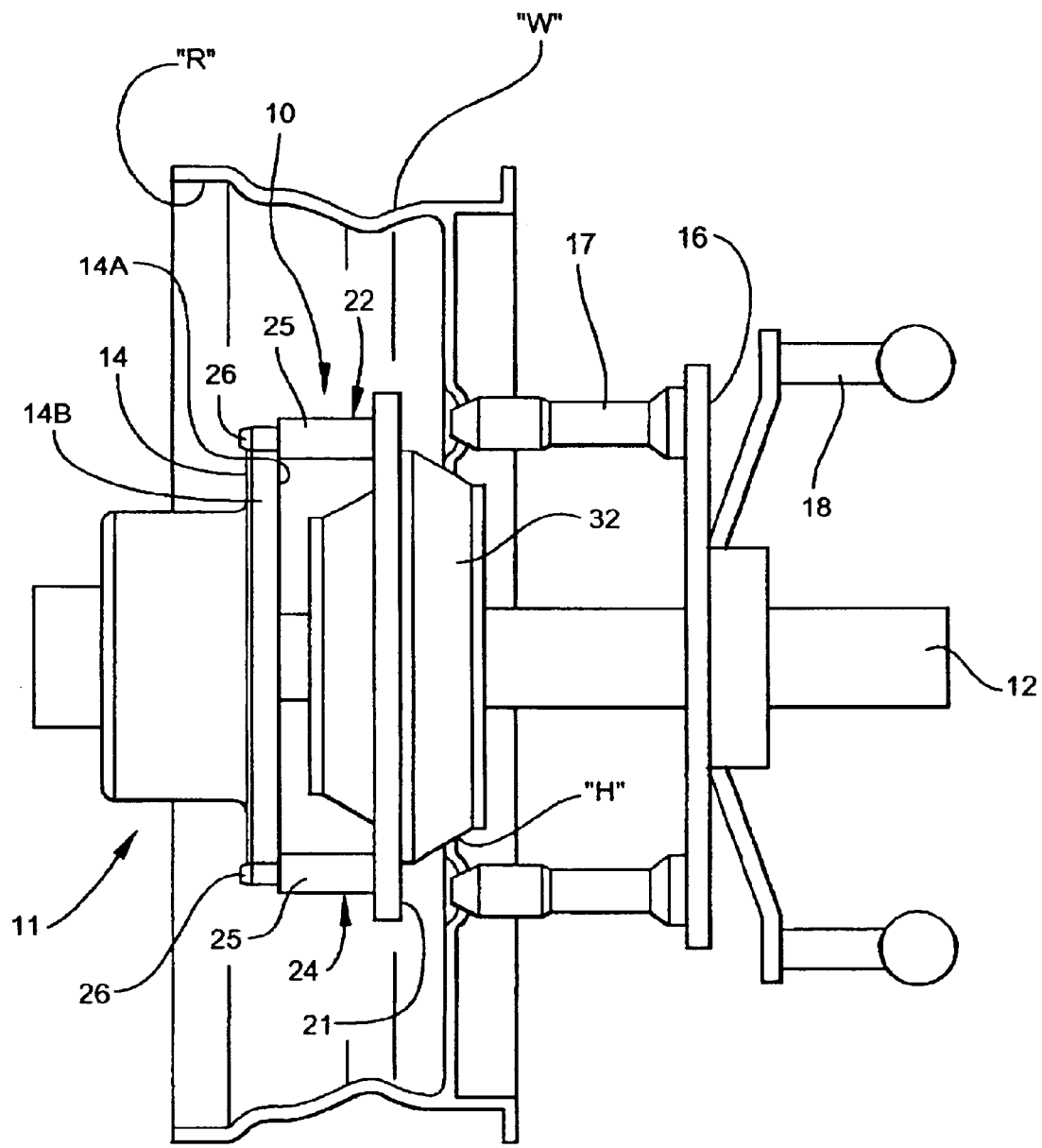
FIG. 5 is a side elevation of the mid-centering device with the wheel spacer positioned against the face plate, the centering cone located within the metal ring of the spacer, and a wheel rim clamped to the horizontal mounting shaft against the centering cone.

As best shown in FIG. 2, spin balancers incorporate a mid-centering device 11 including a horizontal mounting shaft 12 extending outwardly from a motor housing (not shown), and an annular face plate 14 fixed to the mounting shaft 12 near the housing. The shaft 12 is operatively connected to an electric drive motor contained in the motor housing. As shown in FIG. 5, the vehicle wheel "W" is applied to a threaded free end the mounting shaft 12 through its center hole "H", and is clamped into position using a standard flange plate 16 with centering studs 17 and wingnut tightener 18. The clamping means cooperates with the face plate 14 to sandwich and dynamically center the wheel "W" on the mounting shaft 12. The spacer 10 sits between the face plate 14 and wheel "W" to create sufficient clearance between the wheel rim "R" and motor housing, thereby allowing free and unobstructed rotation of the wheel "W" by the mounting shaft 12. In vehicle wheel balancers, the drive motor operates to spin the mounting shaft 12 and wheel "W" at speeds as low as 50 rpm.

Figure 3:
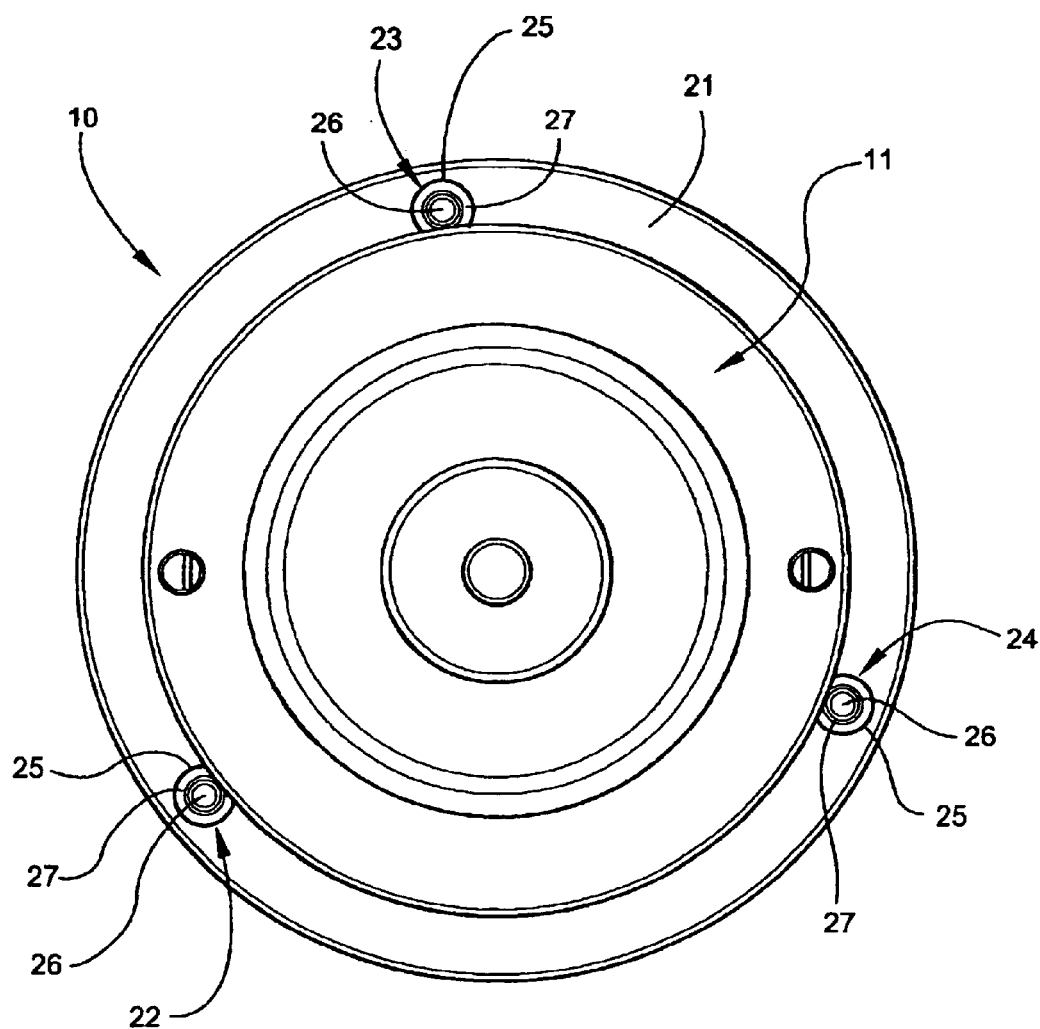
FIG. 3 is a back end view of the face plate, and showing portions of the spacer pins which engage the outer edge of the face plate.

Referring to FIGS. 1, 2, and 3, the wheel spacer 10 comprises a flat metal ring 21 defining opposing inside and outside major surfaces, and three steel spacer pins 22, 23, and 24 extending perpendicularly outwardly from the inside surface. Each spacer pin 22, 23, 24 has a cylindrical body 25 and a reduced-diameter locating tip 26. The free end of the cylindrical body 25 forms a perfectly flat annular shoulder 27 around the locating tip 26. The shoulder 27 is designed to engage an outer edge of the balancer face plate 14, as best shown in FIG. 3. The locating tip 26 extends beyond a mounting surface 14A of the face plate 14, and resides closely adjacent the plate's outer rim 14B to properly locate the spacer 10 and hold it in position during operation of the servicing machine. Preferably, the spacer pins 22, 23, and 24 are arranged 120-degrees apart, and contact less than 5% of the surface area of the face plate mounting surface 14A. More preferably, the spacer pins 22, 23, 24 contact less than 1% of the mounting surface 14A. The "mounting surface" is defined herein as the exposed surface of the face plate 14 facing the vehicle wheel and extending perpendicular to the mounting shaft 12. In addition, to accommodate wheels with large center holes, the outer diameter of the metal ring 21 is preferably greater than the outer diameter of the face plate 14.

Figure 4:
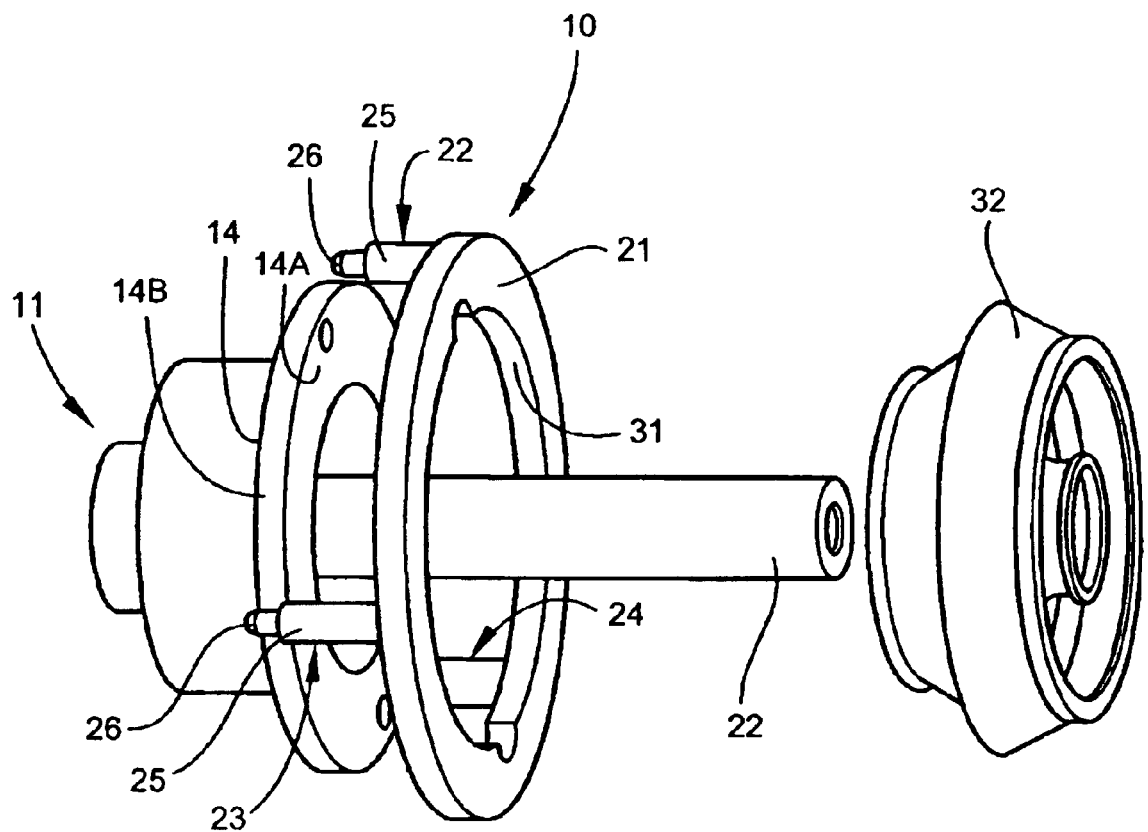
FIG. 4 is perspective view of the mid-centering device with the wheel spacer located against the face plate, and showing a centering cone exploded away from the mounting shaft.

As shown in FIGS. 4 and 5, the flat metal ring 21 of the spacer 10 defines a center opening 31 sufficiently large to receive and accommodate a centering cone 32 applied to the mounting shaft 12 between the face plate 14 and vehicle wheel "W". The centering cone 32 fits within the center hole of the vehicle wheel "W" and operates to statically center the wheel on the mounting shaft 12. Preferably, the center opening 31 is greater than 50% of the outer diameter of the metal ring 21. The wheel "W" is tightened and clamped into position on the threaded mounting shaft 12, as described above, using a common flange plate 16 with centering studs 17 and a threaded wingnut fastener 18.

Figure 6:
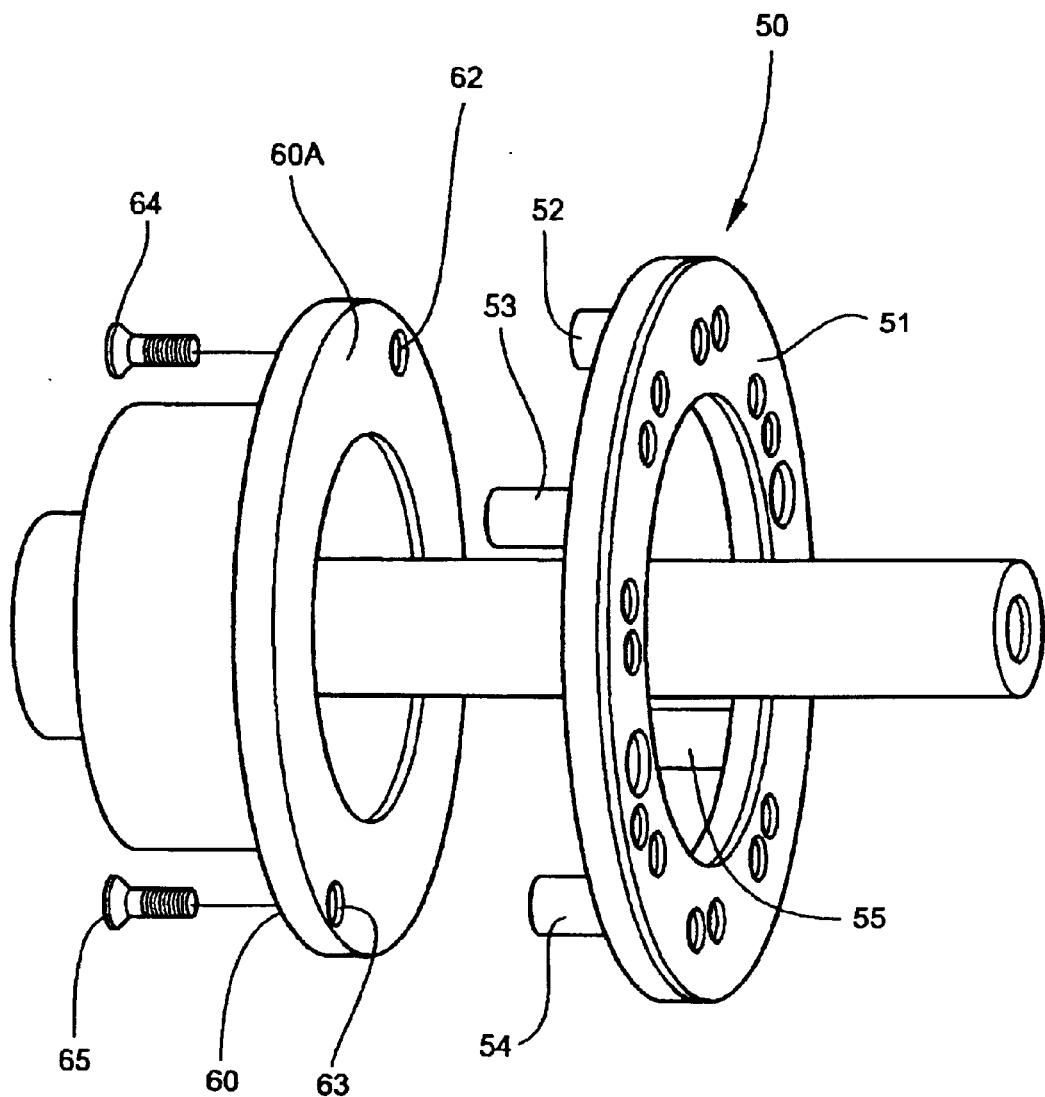
FIG. 6 is a perspective view of a mid-centering device with a wheel spacer according to a second preferred embodiment of the invention, and showing the spacer exploded away from the face plate.

A further embodiment of a wheel spacer according to present invention is illustrated in FIG. 6. Like spacer 10, the wheel spacer 50 comprises a flat metal ring 51 defining opposing inside and outside major surfaces, and several steel spacer pins 52, 53, 54, and 55 extending perpendicularly outwardly from the inside surface. Each spacer pin 52–55 has an internal screw thread. The free end of each pin 52–55 forms a perfectly flat annular surface designed to entirely engage the mounting surface 60A of the balancer face plate 60. At least two of the spacer pins 52 and 54 align with respective bolt holes 62 and 63 formed in the face plate 60. Threaded bolts 64 and 65 are received through the holes 62, 63 and into the complementary-threaded spacer pins 52, 54 to properly locate the spacers 50 and hold it in position during operation of the servicing machine. Preferably, the spacer pins 52–55 are arranged 90-degrees apart, and contact less than 5% of the surface area of the face plate mounting surface 60A.

Figure 7:
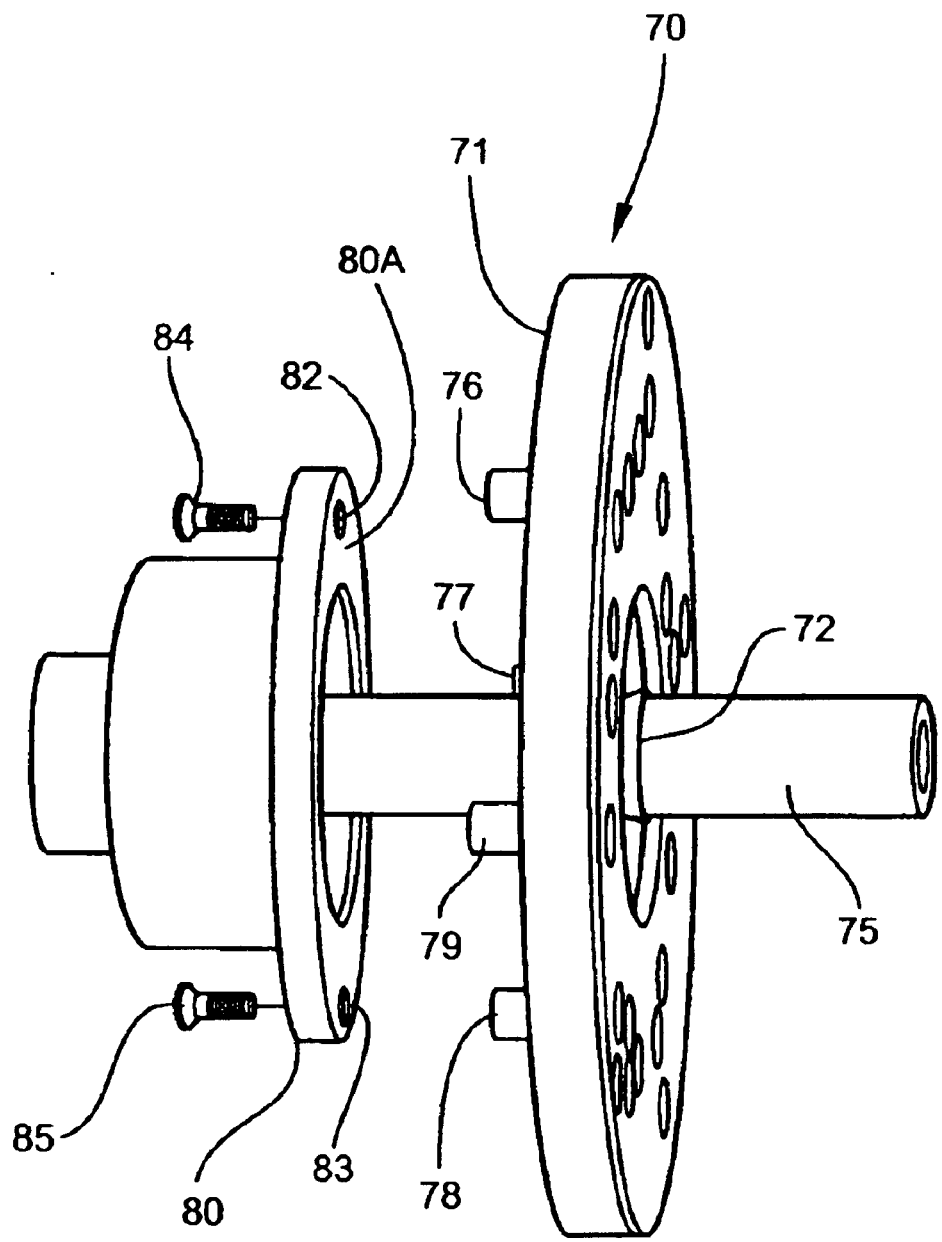
FIG. 7 is a perspective view of a mid-centering device with a wheel spacer according to a third preferred embodiment of the invention, and showing the spacer exploded away from the face plate.

A third embodiment of a wheel spacer 70 is shown in FIG. 7. Spacer 70 comprises a flat disc 71 with a center hole 72 designed to closely receive the mounting shaft 75 of the servicing machine. Several steel spacer pins 76, 77, 78, and 79 extend perpendicularly outwardly from an inside major surface of the disc 71. Each spacer pin 76–79 has an internal screw thread. The free end of each spacer pin 76–79 forms a perfectly flat annular surface designed to entirely engage the mounting surface 80A of the balancer face plate 80. At least two of the spacer pins 76 and 78 align with respective bolt holes 82 and 83 formed in the face plate 80. Threaded bolts 84 and 85 are received through the holes 82, 83 and into the complementary-threaded spacer pins 76, 78 to properly locate the spacer 70 and hold it in position during operation of the servicing machine. Preferably, the spacer pins 76–79 are arranged 90-degrees apart, and contact less than 5% of the surface area of the face plate mounting surface 80A.

A high-accuracy wheel spacer is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. In combination with a mid-centering device used in an off-vehicle spin balancer adapted for balancing a vehicle wheel, said mid-centering device comprising an elongated mounting shaft operatively connected to a balancer motor and extending outwardly from a motor housing, and a face plate fixed to the mounting shaft proximate the motor housing, and said combination further comprising a wheel centering member cooperating with clamping means to sandwich and dynamically center the vehicle wheel on the shaft, a high-accuracy wheel spacer comprising:
   (a) a base having first and second opposing major surfaces;
   (b) a plurality of outwardly-projecting spacer pins depending from the first major surface of said base and engaging a limited surface area of said face plate to space the second major surface of said base away from the face plate, whereby as the vehicle wheel is applied to said mounting shaft and urged towards the second major surface of said base, said wheel centering member penetrates a center hole formed with the vehicle wheel to dynamically center the vehicle wheel on the mounting shaft with said spacer pins cooperating with said base to space the vehicle wheel a predetermined distance from said face plate such that the vehicle wheel sufficiently clears said motor housing for free and unobstructed rotation by said mounting shaft.

2. A combination according to claim 1, wherein said base comprises an annular plate defining a center hole adapted for receiving the mounting shaft of said mid-centering device.

3. A combination according to claim 2, wherein the diameter of the center hole is greater than 50 percent of the diameter of said annular plate, whereby the center hole is sufficiently large to receive a wheel-centering adapter between the face plate of said mid-centering device and the vehicle wheel.

4. A combination according to claim 1, wherein each of said pins has a shoulder adapted for engaging an edge of the face plate, and a reduced-diameter locating tip extending from the shoulder and adapted for engaging a rim of the face plate adjacent the edge.

5. A combination according to claim 4, and comprising no more than four spacer pins.

6. A combination according to claim 1, wherein each of said pins comprises an elongated cylinder adapted for engaging a mounting surface of the face plate.

7. A combination according to claim 6, wherein each of said pins defines an internal screw thread adapted for receiving a complementary-threaded bolt through a bolt hole formed in the face plate.

8. A combination according to claim 7, wherein said wheel spacer comprises no more than four spacer pins.

9. A combination according to claim 1, wherein said wheel spacer comprises three spacer pins.

* * * * *